July 10, 1928.

H. R. LIEBERT ET AL 1,676,832

GAS CELL FOR RIGID AIRSHIPS

Filed Sept. 13, 1927

Inventor
Herman R. Liebert,
Eugen Schoeffel,

By

Attorney

Patented July 10, 1928.

1,676,832

UNITED STATES PATENT OFFICE.

HERMAN RICHARD LIEBERT AND EUGEN SCHOETTEL, OF AKRON, OHIO, ASSIGNORS TO GOODYEAR-ZEPPELIN CORPORATION, OF AKRON, OHIO, A CORPORATION OF DELAWARE.

GAS CELL FOR RIGID AIRSHIPS.

Application filed September 13, 1927. Serial No. 219,238.

Our invention relates to dirigible airships and it has particular relation to a rigid airship having a plurality of gas-inflated cells therein.

One object of our invention is to provide a novel arrangement of gas cells peculiarly adapted to be employed in rigid airships.

Another object of our invention is to provide a novel arrangement of gas cells which is adapted to maintain the proper trim of an airship and to facilitate the steering and stabilization thereof.

Rigid airships having transversely disposed inherently rigid main rings are provided with relatively slack bulkheads secured circumferentially within the main rings. The bulkheads are installed in a slack condition in order to avoid imposing injurious radial forces upon the main rings when the bulkheads are bulged axially of the rings by the action of the gas thereagainst. When one of two adjacent gas cells which impinges against the bulkhead becomes empty, the pressure against the latter is at its maximum.

Under normal operating conditions, the gas cells of an airship are not generally entirely inflated. If the airship assumes an inclined position in flight, the gases press against the bulkheads and move longitudinally of the airship until the bulkheads become taut. This movement of the gas shifts the center of buoyancy and adversely influences the trim of the airship and must be counter-balanced by the elevators. Especially in gusty weather such conditions require great activity on the part of the helmsman, because the tendency of the airship to become unstable is then more pronounced.

By employing gases under different pressures in the adjacent gas cells according to our invention the disadvantages resulting from the arrangement above described will be obviated.

Figure 1:
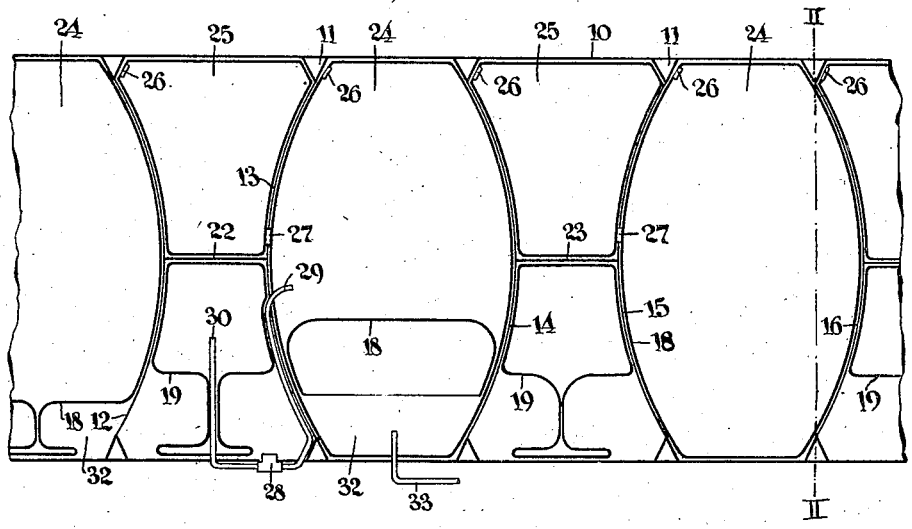
Figure 2:
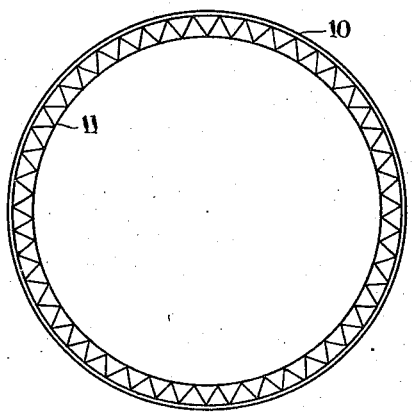

For a better understanding of our invention, reference may now be had to the accompanying drawings forming a part of this specification, of which:

Fig. 1 is a longitudinal sectional view of an airship provided with gas cells arranged and inflated according to our invention; and Fig. 2 is a cross-sectional view taken substantially along the line II—II of Fig. 1.

In practicing our invention, we provide an airship hull 10 having transversely disposed rigid main rings 11 therein, which are provided with relatively slack flexible bulkheads 12, 13, 14, 15 and 16 connected about the inner circumferential portions of the several rings. A plurality of cells 18, which shall be referred to as high pressure gas cells, and a plurality of cells 19 which shall be referred to as low pressure gas cells are disposed within the spaces between the bulkheads. The bulkheads 12 and 13 are connected by means of a centrally disposed cable or suitable tying member 22 which extends through the gas cells 19. Likewise, a similar tying member 23 connects the bulkheads 14 and 15. If desirable, the connecting members 22 and 23 may be omitted.

Each cell 18 is normally inflated with gas 24 until the opposite walls thereof bulge outwardly toward the respective low pressure gas cells 19, while the latter cells are only parially inflated with gas 25. A material difference in gas pressures in the cells 18 and 19 is thus maintained continuously under normal operating conditions. In order to maintain this condition, conventional safety valves 26 are so set that the gas escapes after it has attained a predetermined pressure.

However, after the gas has again contracted, the relative pressures within the gas cells 18 and 19 will have been changed. Also, while the airship is maneuvering various changes in the gas pressures may occur, which cannot be compensated by the adjustment of the safety valves 26. Accordingly, overflow valves 27 are provided which permit the gas to be transferred from the completely inflated high pressure cells 18 to the partially inflated low pressure cells 19. This prevents the gas from escaping as long as the adjacent low pressure gas bags are not fully inflated. Likewise, a pump 28, having conduit connections 29 and 30 leading into the cells 18 and 19 respectively, is employed for conveying gas from the partially inflated cells 19 into the high pressure cells 18 to replace such gas as may have escaped during maneuvering operations.

If desirable, the lower portion of the cells 18 may be provided with spaces 32 containing fuel gas which is directed to an airship motor (not shown) through a pipe connection 33. Separate gas cells, of course, could be disposed within the spaces 32 or such gas cells could be enclosed within the cells 18. In the event fuel gas is employed, the volume of it that is consumed by the motors must be replaced by pumping gas from the partially inflated cells 19 in order constantly to maintain the proper relatively high pressure within the cells 18.

In some instances, gas may be entirely exhausted by accident or otherwise from one or more of the cells 18, thus creating an abnormal condition. Then the bulkheads enclosing the exhausted cell become slack, but they are maintained in substantially their proper position by the connections 22 and 23.

From the foregoing description it will be apparent that we have devised a novel arrangement of gas cells which insures proper maneuvering of an airship under all conditions which involve changes in the gas pressures.

Although we have illustrated but one form which our invention may assume and described in detail but a single application thereof, it will be apparent to those skilled in the art that it is not so limited but that various minor modifications and changes may be made therein without departing from the spirit of the invention or from the scope of the appended claims.

What we claim is:

1. In an airship having inherently rigid main rings, a gas cell having gas under pressure therein, and a gas cell disposed contiguously on each side of the first-mentioned gas cell, and having gas therein under materially lower pressure than the gas in the first-mentioned gas cell.

2. In an airship having inherently rigid main rings, a gas cell having gas under pressure therein, and a gas cell disposed contiguously on each side of the first-mentioned gas cell, and having gas therein under materially lower pressure than the gas in the first-mentioned gas cell and bulkheads connected circumferentially within the main rings and separating the respective gas cells.

3. In an airship having inherently rigid main rings, a gas cell having gas therein under relatively low pressure, and a gas cell on each side of the first-mentioned gas cell having gas therein under relatively higher pressure, and bulkheads connected circumferentially within the main rings and separating the respective gas cells.

4. In an airship having inherently rigid main rings, a gas cell having gas under relatively low pressure therein, a gas cell disposed contiguously on each side of the first-mentioned gas cell, and having gas therein under relatively high pressure, bulkheads separating the gas cells and a connection extending through the first-mentioned gas cell and secured to the bulkheads on opposite sides thereof.

5. In an airship having inherently rigid main rings disposed transversely thereof, a series of gas cells within the airship, gas under relatively high pressure entirely inflating said gas cells, a second series of gas cells, gas under relatively low pressure partially inflating the second series of gas cells, the cells of the two series being arranged alternately, and bulkheads connected circumferentially within the main rings and separating the adjacent gas cells.

6. In an airship having a hull construction, spaced gas cells having gas therein under relatively high pressure, gas cells having gas therein under relatively low pressure disposed between the spaced gas cells and means connecting adjacent gas cells for automatically supplying gas from the cells having gas under relatively low pressure to the cells having gas under relatively high pressure, when a material change in the gas pressure in the last-mentioned cells occurs.

7. In an airship having a hull construction, a plurality of spaced gas cells having gas therein under relatively high pressure, gas cells having gas therein under relatively low pressure disposed between the spaced gas cells, means connecting adjacent gas cells for supplying gas from the cells having gas under relatively low pressure to the cells having gas under relatively high pressure, and an overflow valve connecting adjacent cells and operable automatically to convey gas from the cells having gas therein under relatively high pressure to the cells having gas therein under relatively low pressure when the gas pressure in the first-mentioned cells increases a predetermined degree.

8. In an airship having inherently rigid main rings therein, a gas cell having gas therein under relatively high pressure, a gas cell on each side of the first-mentioned gas cell having gas therein under relatively low pressure, and bulkheads connected relatively loosely to the main rings, adjacent bulkheads being bulged in opposite directions by the gas under relatively high pressure in the first-mentioned gas cell.

In witness whereof, we have hereunto signed our names.

HERMAN RICHARD LIEBERT.
EUGEN SCHOETTEL.